INVENTOR.
CORNELIS VAN DER LELY

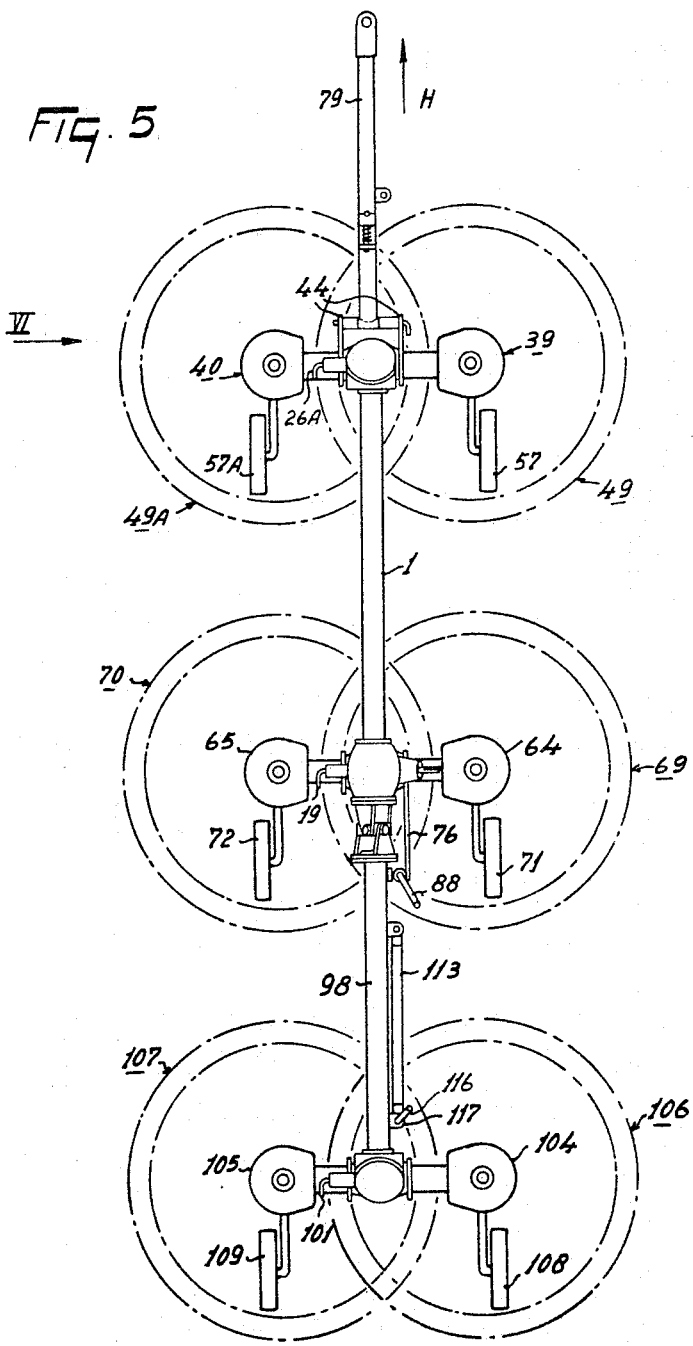

3,267,656
DEVICE FOR WORKING CROP LYING
ON THE GROUND
Cornelis van der Lely, Zug, Switzerland, assignor to Patent Concern N.V., Willemstad, Curacao, Netherlands Antilles, a limited-liability company of the Netherlands Antilles
Filed Aug. 24, 1964, Ser. No. 391,384
Claims priority, application Netherlands, Aug. 30, 1963, 297,381
18 Claims. (Cl. 56—370)

The invention relates to a device for working crop lying on the ground, comprising a ground-wheel supported frame and a number of rake members arranged in groups, while each group is coupled by means of one supporting member with the frame.

In accordance with the invention two groups are connected each with the aid of a supporting member with a first frame beam, while a third group is arranged with the aid of a supporting member on a second frame beam, one end of which is coupled with one end of the first frame beam, whereas in the transport position the frame beams extend at least substantially in the direction of travel and the second frame beam is pivotable in a horizontal and a vertical direction with respect to the first frame beam. Despite the comparatively great length of the device, it can thus be easily transported.

According to a second aspect of the invention a supporting member is adapted to turn with respect to the frame solely around an axis of rotation extending obliquely upwards in normal operation, said axis coinciding with the center line of a driving shaft through which the rake members are driven. In this manner a simple driving mechanism for the rake members can be obtained.

The invention furthermore relates to a device for working crop lying on the ground, comprising a frame and at least two rake members which are adapted to rotate about an axis of rotation being at an angle to the horizontal, the arrangement being such that the facing sides of the rake members, viewed from above, rotate in the same directions in operation, while a ground wheel is arranged beneath each rake member.

According to the invention the two axes of rotation of the rake members are located, in a plan view, between the ground wheels, so that there is sufficient space to displace the crop between the ground wheels to the rear.

The invention furthermore relates to a device for working crop lying on the ground, comprising a frame with at least two rake members which are coupled with a frame beam with the aid of one supporting member.

According to the invention the shaft of a rake member is journalled in a gear box forming the end of a supporting member, and being integral with a hollow frame beam which extends at right angles to the shaft of the rake member and which forms part of the supporting member and in which a shaft for driving the rake member is journalled, while the end remote from the gear box is detachably fastened to one side of a gear box, on the other side of which there is fastened the end of a second hollow frame beam which connects the gear box with the gear box integral with said hollow frame beam, in which the shaft of the second rake member is journalled.

In this manner a simple and efficacious construction of the supporting members can be obtained.

For a better understanding of the invention and to show how the same may be readily carried into effect, reference is made by way of example to the accompanying drawing, in which FIG. 1 is a plan view of the device in a working position, in which the rake members are shown diagrammatically.

FIG. 5 shows the device in a position suitable for transport purposes, the rake members being shown diagrammatically.

Figure 1:
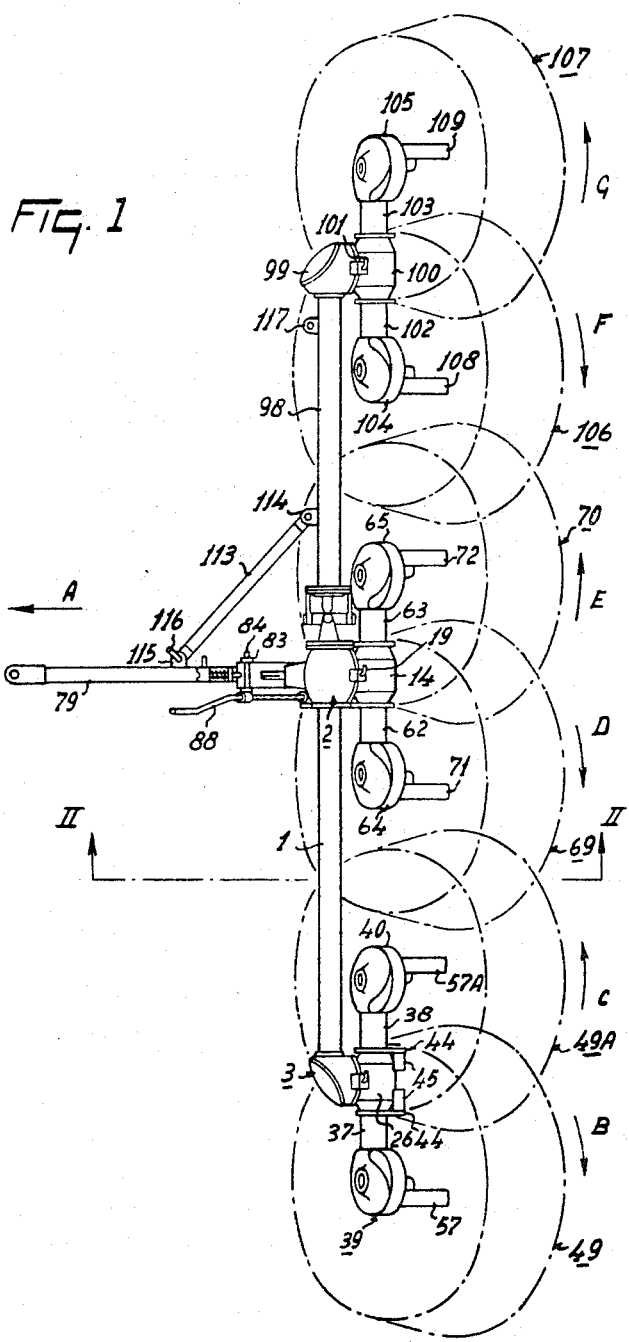
Figure 3:
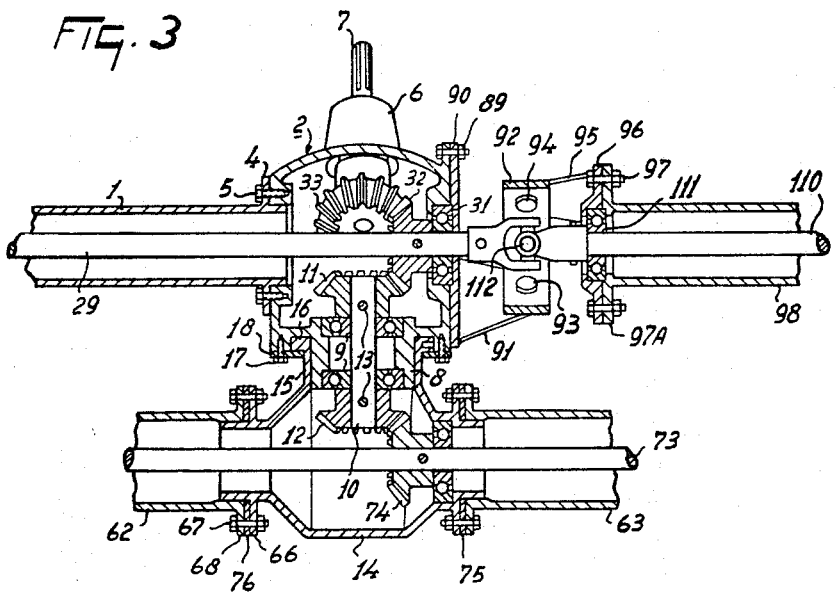
FIG. 3 is a sectional view taken on the line III—III in FIG. 2.
Figure 4:
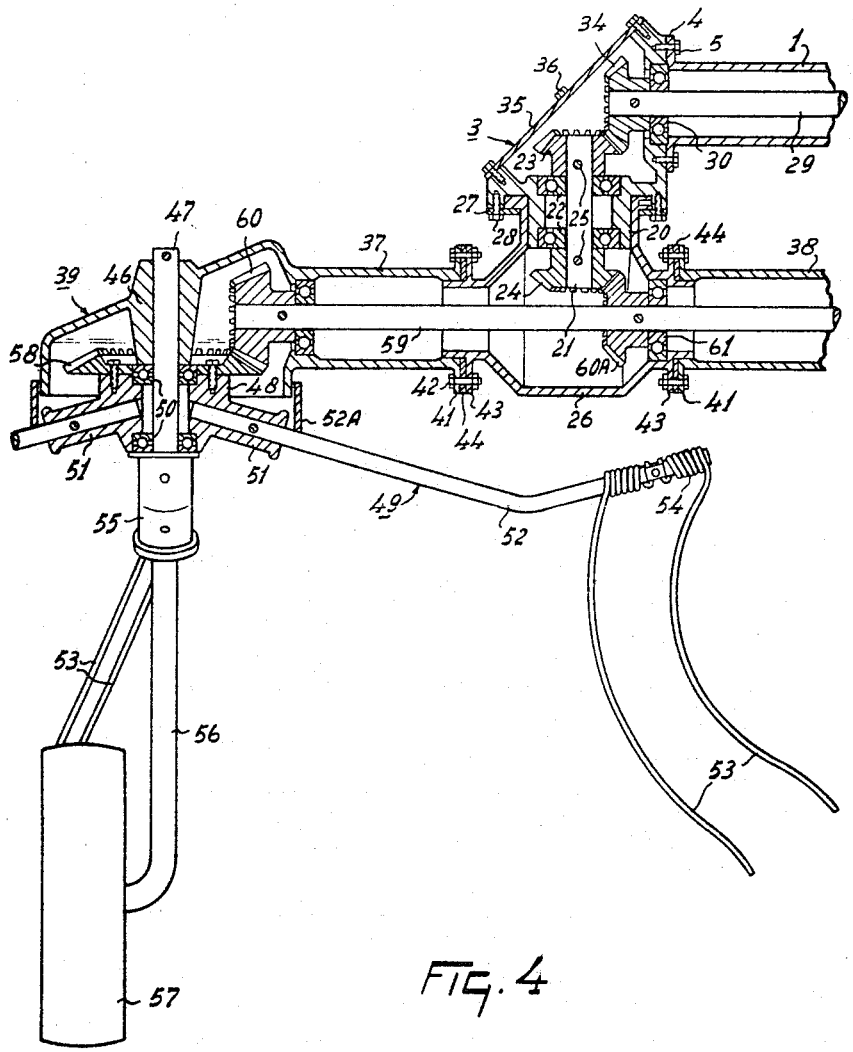
FIG. 4 is a sectional view of a supporting member for the rake members.

The device shown in FIG. 1 comprises a frame beam 1, to the ends of which gear boxes 2 and 3 are secured. To this end the extremities of the frame beam 1 are provided with flanges 4, which are clamped to the gear boxes with the aid of bolts 5 (FIGS. 3 and 4). A sleeve 6, forming part of the gear box 2, accommodates a shaft 7, which extends, in the normal operational position of the device in a horizontal direction at right angles to the frame beam 1. One end of the shaft 7 projects from the sleeve 6. The gear box 2 comprises furthermore a sleeve 8 accommodating a shaft 10 with the aid of bearings 9. The ends of the shaft 10 are provided with bevel gear wheels 11 and 12 with the aid of pins 13. The bearings 9 are enclosed between the gear wheels 11 and 12 and a shoulder of the sleeve 8.

Around the sleeve 8 is adapted to turn a sleeve 15, fastened to a gear box 14. The end of the sleeve 15 is provided with a flange 16, which is arranged in a recess provided in the gear box 2 and surrounding the sleeve 8. The flange 16 is enclosed between a wall of the gear box 2 and a ring 18, fastened with the aid of bolts 17 to the gear box, so that the gear box 14 is adapted to turn about the center line of the shaft 10 which coincides with the center line of the sleeve 8, with respect to the gear box 2.

To the gear box 2 is fastened a spring-actuated locking pin 19, which is partly accommodated in a bore in the wall of the box 2. The end of the pin 19 can be inserted into one of the radial holes in the side of the flange 16 so that the gear box 14 can be locked against rotation about the sleeve 8 in different positions.

The gear box 3 (FIG. 4) comprises a sleeve 20, the center line of which intersects at right angles the center line of the frame beam 1. The sleeve 20 accommodates a shaft 21 by means of ball bearings 22. The ends of the shaft 21 are provided with bevel gear wheels 23 and 24, by means of pins 25. The shape and the arrangements of the elements 8 to 13 are identical to those of the parts 20 to 25. In the same manner in which the gear box 14 is coupled with the gear box 2, a gear box 26 is coupled with the gear box 3 by means of a ring 27 and bolts 28. The construction of the gear box 26 is identical to that of the gear box 14. The gear box 26 can also be locked against rotation by means of a locking pin 26A. The gear boxes 2 and 3 with the beam 1 connected therewith and the gear boxes 14 and 26 can be manufactured in a simple manner, for example from cast iron. The construction described above provides furthermore a simple and rugged connection between the various parts.

A shaft 29, journalled in the frame beam 1, and having its center line coinciding with the center line of the circular frame beam 1, is journalled in the gear box 3 with the aid of a bearing 30 in a wall of the gear box 3 and with the aid of a bearing 31 in a wall of the gear box 2. The portion of the shaft 29 located in the gear box 2 is provided with a bevel gear wheel 32, the teeth of which engage both the toothing of a bevel gear wheel 33, secured to the shaft 7, and the toothing of the bevel gear wheel 11. The end of the shaft 29 located in the gear box 3 is provided with a bevel gear wheel 34, the teeth of which engage the teeth of the bevel gear wheel 23. The gear box 3 is closed by means of a lid 35, which is secured by bolts 36 to said gear box. The flat lid 35 is at an angle of 45° both to the center line of the shaft 29 and to the center line of the shaft 21 and is at right angles to the plane going through the two center lines.

On either side of the gear box 26 there are fastened aligned beams formed by round tubes 37 and 38, which are integral with the gear boxes 39 and 40 respectively. For this purpose the ends of the beams 37 and 38 are provided with flanges 41, which are secured by means of bolts 42 to flanges 43, which are integral with the gear box 26. Between the flanges 41 and 43 there are arranged plates 44, to which aligned sleeves 45 are secured (FIG. 1). A sleeve 46, forming part of the gear box 39, accommodates a shaft 47, which extends obliquely to the rear in downward direction in the normal operational position of the device and which is at an angle of at least approximately 45° to the horizontal. The vertical plane going through the center line of the shaft 47 and the projection of said shaft onto the horizontal plane are at right angles to the center line of the beams 37 and 38.

The portion of the shaft 47 projecting beneath the sleeve 46 has rotatably arranged on it a hub 48 of a rake member 49, which hub is supported by means of bearings 50 from the shaft 47. The hub 48 of the rake member is integral with four sleeves 51, turned relatively to each other through 90° and accommodating the ends of spokes 52. The end of each spoke is provided with two resilient tines 53. Each tine is connected with the spoke by means of a number of coils 54, surrounding the spoke. In the lowermost position of the tine (FIG. 2) the portion joining the coils extends along a curved line first to the rear in the direction of the axis of rotation of the rake member and then turns slightly away from the axis of rotation and terminates in a portion which is at least substantially vertical to the ground surface. With respect to the sense of rotation of the rake member the tines are slightly bent over to the rear, which is illustrated in FIG. 4.

The end of the shaft 47 projecting beneath the hub of the rake member is provided with a sleeve 55, which comprises two portions arranged at an angle to each other. The end of a rod 56 is fastened in that portion of the sleeve 55 which is an angle of about 140° to the portion of the sleeve 55, which accommodates the end of the shaft 47. The other end of the rod 56 is bent over at right angles and constitutes the horizontal axle for a ground wheel 57.

The hub 48 of the rake member 49 is furthermore provided with a bevel gear wheel 58, the teeth of which engage a bevel gear wheel 60, fastened to a shaft 59. The shaft 59, which is supported in bearings 61 arranged in the gear boxes 26, 39, 40, is journalled in the two frame beams 37 and 38 and in the gear box 26. The portion of the shaft accommodated in the gear box 26 is provided with a bevel gear wheel 60A, the teeth of which engage the teeth of the bevel gear wheel 24. The end of the shaft 59, located in the gear box 40, is also provided with a bevel gear wheel, through which a rake member 49A, which is adapted to rotate about a shaft located in the gear box 40, extending parallel to the shaft 47, is driven. Beneath the rake member 49A, like beneath the rake member 49, there is arranged a ground wheel 57A.

The gear box 26 with the beams 37 and 38 and the gear boxes 39 and 40 constitutes a supporting member for the rake members 49 and 49A. The supporting member is symmetrical to a vertical plane at right angles to the center lines of the tubes 37 and 38 and going through the axis about which the supporting member is adapted to turn with respect to the frame beam 1.

In the manner in which the gear box 26 is provided with further members, the gear box 14 is provided with the aid of frame beams 62 and 63 with a gear box 64 and 65 respectively. For this purpose flanges 66, fastened to the gear box 14 are connected by bolts 67 with flanges 68, fastened to the frame beams 62 and 63. The gear boxes 64 and 65 accommodate shafts about which rake members 69 and 70 are adapted to rotate, while ground wheels 71 and 72 are arranged beneath the rake members. The rake members 69 and 70 are driven through a shaft 73, to which a bevel gear wheel 74 is fastened, the teeth of which engage the teeth of the bevel gear wheel 12. The construction of the supporting member of the rake members 69 and 70, formed by the gear boxes 14, 64 and 65 and the beams 62 and 63, is similar to the construction of the supporting member of the rake members 49 and 49A.

Figure 2:
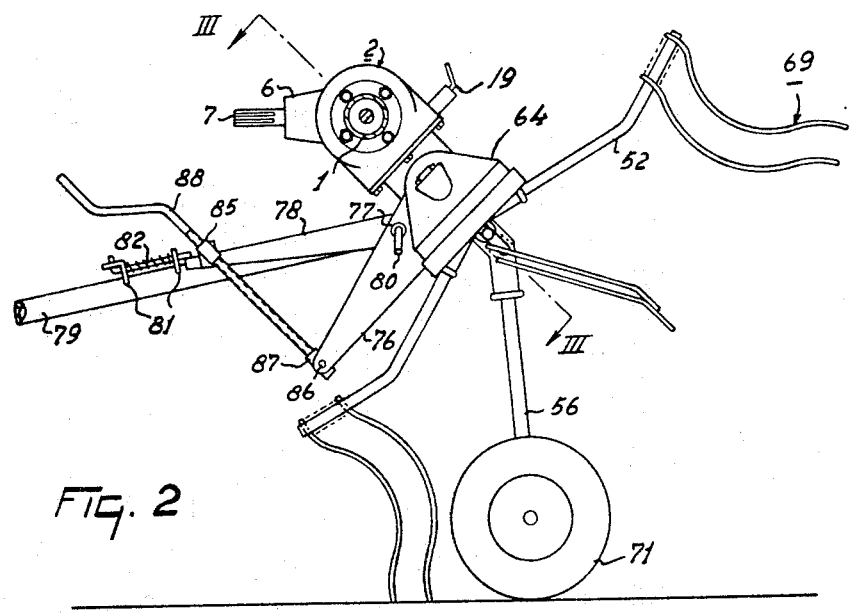
FIG. 2 is a sectional view taken on the line II—II of FIG. 1.
Figure 6:
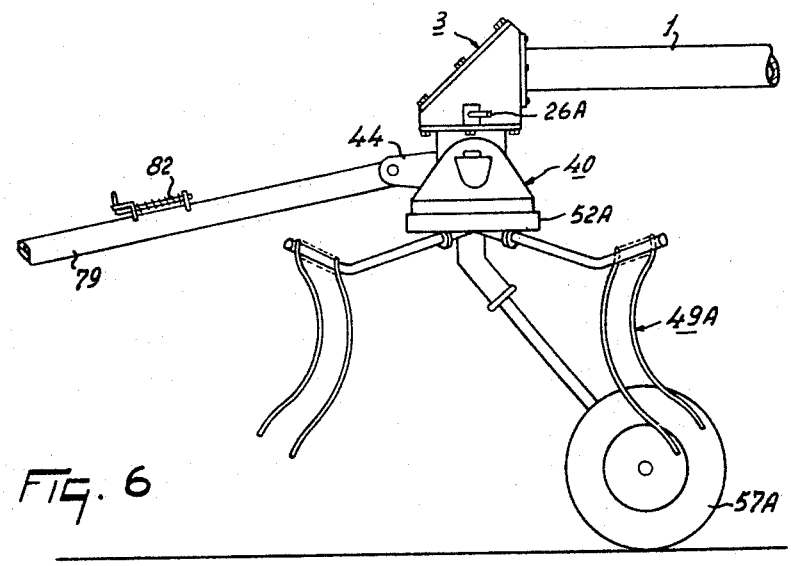
FIG. 6 is a side elevation of the front part of the device in the position shown in FIG. 5, taken in the direction of the arrow VI in FIG. 5.

Between the flanges 66 and 68 there are arranged two forwardly extending plates 75 and 76, between which two sleeves 77 are provided, the thinner ends of which are rotatably arranged in the plates 75 and 76 (FIG. 2). The sleeves 77 have secured to them the ends of the parallel limbs of a U-shaped plate 78 so that the plate 78, together with the sleeves 77, is adapted to turn relatively to the supports 75 and 76. Between the two limbs of the plate 78 there is located the hindmost part of a draw bar 79. The end of the draw bar 79, located between the sleeves 77, is provided with a hole and the draw bar 79 is coupled with the frame by means of a locking pin 80, which is inserted through the sleeves 77 and through the hole in the end of the draw bar 79.

The draw bar is furthermore provided with two supports 81, in which a spring-loaded locking pin 82 is arranged in known manner. In the working position of the device shown in FIGS. 1 and 2 the end of the plate 78 is enclosed between the end of the locking pin 82 and the draw bar 79, so that the plate 78 cannot turn with respect to the draw bar 79.

The U-shaped plate 78 is furthermore provided with two ears 83 accommodating a shaft 84, extending parallel to the locking pin 80. At one end of the shaft 84 there is provided a block 85, provided with a tapped hole. One end of the support 76 is provided with a block 87 so as to be pivotable by means of a gudgeon 86, extending parallel to the shaft 84. The block 87 receives the end of a screw spindle 88, which is screwed through the tapped hole in the block 85, the spindle being thus freely rotatable but not displaceable.

The side of the gear box 2 remote from the frame beam 1 is provided by means of bolts 89 with a plate 90 (FIG. 3). Two ears 91 are fastened to the plate 90 at right angles thereto. Between the ears 91 is arranged a ring 92, which is pivoted to the ears 91 with the aid of gudgeons 93, which are in a vertical position in normal operation. The ring 92 is furthermore provided with two gudgeons 94, which are in a horizontal position in normal operation. The center lines of said gudgeons are located in a vertical plane together with the center lines of the gudgeons 93. With the aid of the gudgeons 94 two ears 95, both fastened to a vertical plate 96, are pivoted to the ring 92.

The plate 96 has fastened to it by means of bolts 97 a flange 97A, fastened to the tube 98, forming a hollow frame beam. The end of the tube 98, remote from the plate 96, is provided with a gear box 99, which is constructed in the same way as the gear box 3, fastened to the frame beam 1. A gear box 109, corresponding with the gear box 26, is rotatably coupled with the gear box 99. The gear box 100 can be secured against rotation relative to the gear box 99 by means of a locking pin 101. On either side of the gear box 100 there are arranged aligned beams 102 and 103, which are integral with the gear boxes 104 and 105 respectively.

The construction of the supporting member formed by the parts 100 and 102 to 105 is identical with the structure of the supporting member formed by the parts 26, and 37 to 40. With the aid of the supporting member formed by the parts 100 and 102 to 105, like is described for the rake members 49 and 49A and the ground wheels 57 and 57A, two rake members 106 and 107 and two ground wheels 108 and 109 located beneath said rake members are coupled with the frame. The rake members 106 and 107 can be driven by means of a shaft 110, which is journalled in the frame beam 98 and is supported in bearings 111. The shaft 110 is coupled by means of a universal joint 112 with the end of the shaft 29. The center of the universal joint 112 is located in the vertical plane going through the center lines of the gudgeons 93 and 94.

From FIG. 1 it will be apparent that the frame beam 98 which is in line with the frame beam 1, is secured against a turn about the vertical gudgeons 93 with respect to the frame beam 1 by means of a coupling rod 113, which extends between a support 114, fastened to the frame beam 98 and a support 115, fastened to the draw bar 79, with which the coupling rod is connected with the aid of a locking pin 116. The frame beam 98 is capable of limited turning movements in operation about the gudgeons 94, fastened to the ring 92 and located in a horizontal position in operation, so that the rake members 106 and 107, coupled with the frame beam 98, are freely movable in upward and downward directions with respect to the rake members coupled with the frame beam 1.

The device described above operates as follows.

The device can be attached by means of the draw bar 79 to a tractor or a similar vehicle and be moved in the direction of the arrow A. The shaft 7 can be coupled with the aid of an intermediate shaft with the power take-off shaft of the vehicle so that the rake members can be driven from the power take-off shaft. The drive of the rake members is then such that the facing sides thereof, viewed from above, move both to the rear so that the rake members 49 and 49A rotate in the direction of the arrow B and C respectively. The rake members 69 and 70 in the direction of the arrow D and E respectively and the rake members 106 and 107 rotate in the direction of the arrow F and G respectively. Since the tines occupy their lowermost positions when they are located in front of the point of intersection of the axis of rotation of the rake member with the ground, the crop located in front of the rake members will be caught by the tines and be conveyed through two rake members of one group to the rear so that it is airily spread on the ground behind the device. Since the tines extend, at least over part of their lengths, in a direction towards the axis of rotation and are, moreover, bent over against the sense of rotation of the rake member, they are readily capable of avoiding unevennesses of the ground and with a small angular rotation they move upwardly over a fairly great distance, so that even in the event of larger unevennesses they maintain an advantageous position for carrying the crop along.

Since, as will be seen from FIG. 1, the axes of rotation of the rake members coupled with one supporting member are located, viewed from above, between the ground wheels arranged beneath the rake members concerned, the ground wheels of one group are spaced apart by a fairly great distance from each other, so that they will not hinder the displacement of the crop. For fastening the ground wheels a simple, straight rod may be employed in this case. The position of the axes of rotation of the rake members may be modified by turning the screw spindle 88, so that the whole frame is turned with respect to the draw bar about the locking pin 80.

In order to change over the device to the position suitable for transport purposes, the draw bar 79 and the coupling rod 113 are removed and the supporting members of the rake members can be turned relatively to the frame beams 1 and 98 through an angle of 90° about the center lines of the shafts 21 and 10 respectively and about the shaft located in the gear box 99. As a result of this turn of the supporting members the frame beams 1 and 98 will be turned automatically about their longitudinal axes so that the shafts 10, 21 and the corresponding shaft located in the gear box 99 occupy a vertical position. However, as an alternative, first the frame beams can be turned with the aid of the screw spindle through an angle of about 45° with respect to the draw bar, after which the supporting members can be swung through an angle of about 90° with respect to the frame beams.

Then the device occupies the position shown in FIG. 5. The end of the draw bar 79, which is detached from the central supporting member by removing the locking pin 80, is arranged between the sleeves 45, which are secured to the supporting member coupled with the frame beam 1, said end being pivoted with the aid of the locking pin 80 to said sleeves. The supporting member with which the draw bar is coupled is, in this position, freely rotatable about the center line of the shaft 21, whereas the two further supporting members are blocked in their turn with respect to the frame beams. The device, which has, in this position, a comparatively small width, as will be seen from FIG. 5, can be drawn by means of the draw bar in the direction of the arrow H. The frame beam 98 with the hindmost group of rake members is freely rotatable, in the transport position, with respect to the frame beam 1, about two orthogonal pivotal axes formed by the gudgeons 93 and 94. The frame beam 98 with the group of ground wheels 108 and 109 thus constitutes so to say a two-wheel trailer, which is pivotally coupled with the four-wheel front carriage formed by the frame beam 1 and the ground wheels attached thereto.

Therefore, in spite of the great length of the device, manoeuvring is easy and comparatively sharp bends can be travelled. The coupling rod 113 extends, in the transport position, along the beam 98 and the end, coupled with the draw bar, in operation, is connected by means of the locking pin 116 with a support 117, fastened to the frame beam 98.

Figure 7:
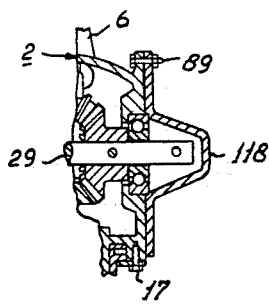
FIG. 7 shows part of a variant of the structure shown in FIG. 3.

If it is desired to use the device with only four rake members, the plate 90 is replaced by a lid 118, fastened to the gear box, by means of which lid the end of the shaft 29 is screened (FIG. 7).

What is claimed is:

1. A tedding device comprising a frame, groups of rake members, a supporting member connecting each of said groups to said frame, ground wheels supporting said supporting members, said rake members having a fixed position relative to their respective supports, said frame comprising a first beam pivotally coupled to a second beam, at least two groups of rake members being supported on said first beam, a further group of rake members being supported on said second beam, means for pivoting said second beam both horizontally and vertically relative to said first beam, said rake members being arranged in a single row which extends substantially parallel to said frame beams and transverse to the direction of travel, the first frame beam accommodating a rotatable shaft, said rotatable shaft being connected to at least one drive shaft for rotating said raking members, said drive shaft being substantially perpendicular with respect to said rotatable shaft.

2. The invention of claim 1 wherein a supporting member is turnable about said drive shaft with respect to said rotatable shaft.

3. The invention of claim 1 wherein a second rotatable shaft is provided for driving the rake members, said last-mentioned shaft being substantially parallel to the rotatable shaft and located in the supporting member for said groups of rake members.

4. The invention of claim 1 wherein the rotatable shaft is journalled in the first beam and a universal joint connects said rotatable shaft to the raking member on said second beam.

5. A crop-working device comprising a frame supported on wheels and at least one supporting member mounted on said frame, said supporting member including housings for a rotatable shaft, a gear box at each end of said supporting member, raking members rotatably connected to said shaft in said gear box, a third gear box located between housings in driving engagement with said shaft, one end of said third gear box being mounted on the frame, said third gear box having sleeve means, said sleeve means being connected to said housings, said housings being rotatable about said sleeve means.

6. The invention of claim 5 wherein the sleeve means and the housings are provided with flanges, said flanges being juxtaposable in locking position whereby said housing and sleeve means can be secured relative to each other.

7. The invention of claim 5 wherein the frame includes a hollow beam, said beam accommodating a further rotatable shaft geared to a transmission, said transmission being connected to said third gear box.

8. The invention of claim 5 wherein the raking members and supporting member are turnable about said second beam and positionable at a substantial angle between the vertical and horizontal.

9. A tedding device for working crop lying on the ground, comprising a frame beam, groups of mechanically driven rake members, a supporting member for each group of rake members, ground wheels supporting said supporting members, hinge means connecting said supporting members to said frame, said supporting members being adjustable from a first position in which they extend substantially parallel to said frame beam into a second position in which they extend substantially perpendicular to said frame beam, said hinge means defining an axis which is inclined to the horizontal and to the vertical in said first position.

10. A crop-working device for working crop lying on the ground comprising a frame supported on wheels, groups of rake members, a supporting member connecting each of said groups of rake members to said frame, a rotatable shaft being supported by the frame, said rotatable shaft being connected to a drive shaft for rotating a group of said rake members, said drive shaft being inclined to the horizontal, the supporting member of the group of rake members driven by said drive shaft being adjustable about said drive shaft.

11. A device as claimed in claim 10, wherein the device is supported by ground wheels attached to said supporting members and located beneath the rake members, said rake members being rotatable about axes inclined to the horizontal.

12. A tedding device comprising a frame supported on wheels, groups of rake members, a supporting member connecting each of said groups to said frame, said rake members having a fixed position relative to their respective supports, said frame comprising a first beam pivotally coupled to a second beam, at least two groups of rake members being supported on said first beam, a further group of rake members being supported on said second beam, means for pivoting said second beam both horizontally and vertically relative to said first beam, said rake members being arranged in a single row which extends substantially parallel to said frame beams and transverse to the direction of travel, a detachable coupling member, means for receiving said coupling member at each end of said first beam whereby said device can be placed in working position and transport position by means of said coupling member, and said supporting members connected to the frame beams through drive shafts and gear pieces, said supporting members being turnable about said drive shafts.

13. A tedding device for working crop lying on the ground, comprising a frame beam supported on wheels, groups of mechanically driven rake members, a supporting member for each group of rake members, said supporting members being attached to said frame beam, hinge means for connecting each supporting member to said frame beam, said wheels being connected to said supporting member, said supporting members being adjustable from a first position in which they extend substantially parallel to said frame beam into a second position in which they extend substantially perpendicular to said frame beam, a first locking means provided for locking a first supporting member in said first position and a second locking means provided for locking a second supporting member in said first and said second position, said first supporting member provided with a coupling member for coupling the device with a prime mover.

14. A tedding device having a predetermined direction of travel comprising a frame, groups of mechanically driven rake members provided with resilient tines, a supporting member connecting each of said groups to said frame, said rake members being rotatable about axes of rotation inclined to the horizontal whereby the tines of a raking member engage crop lying on the ground in front of the axis of rotation of said raking member with respect to the direction of travel, said axis of rotation of the rake members having a fixed position relative to their respective supporting members, ground wheels supporting said supporting members, said ground wheels being positioned beneath said rake members, said frame comprising a first beam, a second beam frame pivotally connected to said first beam and at least two groups of rake members in generally alignment therewith being supported on said first beam, a further group of rake members being supported on said second beam, means associated with said beams for pivoting said second beam both horizontally and vertically relative to said first beam, said supports and said rake members being arranged in a single row which extends substantially parallel to said frame beams and transverse to the direction of travel for tedding crop lying on the ground.

15. The invention of claim 14 wherein a detachable coupling member is provided, means for receiving said coupling member near one end of said first beam whereby said device can be placed in working position and means for receiving said coupling member near the other end of said first beam, whereby said device can be placed in transport position.

16. The invention of claim 14 wherein locking means is associated with the frame beams to secure said beams in non-pivotable alignment.

17. A tedding device lying on the ground comprising a frame, groups of rake members arranged in a substantially transverse row, each rake member being rotatable about an axis which is inclined to the horizontal, supporting members connecting a group of rake members to said frame, ground wheels mounted on said supporting members beneath said rake members, hinge means connecting said frame and said supporting member, said hinge means defining an axis which extends substantially perpendicular to said supporting members and between the rake members mounted on said supporting members, said supporting members being pivotable about said axis for tedding crop lying on the ground.

18. A device as claimed in claim 17, wherein a first locking means is provided for locking a first supporting member in said first position and a second locking means is provided for locking a second supporting member in said first and said second position.

(References on following page)

References Cited by the Examiner

UNITED STATES PATENTS

| | | | |
|---|---|---|---|
| 1,670,602 | 5/1928 | Webber | 172—625 |
| 2,334,729 | 11/1943 | Sefcovic | 172—59 |
| 2,678,508 | 5/1954 | Reuter et al. | 172—475 X |
| 2,826,129 | 3/1958 | Olson | 172—59 |
| 2,862,348 | 12/1958 | Van der Lely et al. | 56—377 |
| 2,958,383 | 11/1960 | Danielson | 172—456 |
| 3,183,654 | 5/1965 | Jordan et al. | 56—377 X |

FOREIGN PATENTS

| | | |
|---|---|---|
| 80,473 | 3/1963 | France. |
| 80,922 | 5/1963 | France. |
| 1,324,369 | 3/1963 | France. |
| 1,158,304 | 11/1963 | Germany. |
| 911,872 | 11/1962 | Great Britain. |

ABRAHAM G. STONE, *Primary Examiner.*

RUSSELL R. KINSEY, *Examiner.*

M. C. PAYDEN, *Assistant Examiner.*